March 7, 1939.  A. G. F. WALLGREN  2,149,712

BEARING

Filed March 27, 1936  2 Sheets-Sheet 1

INVENTOR
August Gunnar Ferdinand Wallgren
BY
his ATTORNEY.

March 7, 1939.  A. G. F. WALLGREN  2,149,712
BEARING
Filed March 27, 1936  2 Sheets-Sheet 2
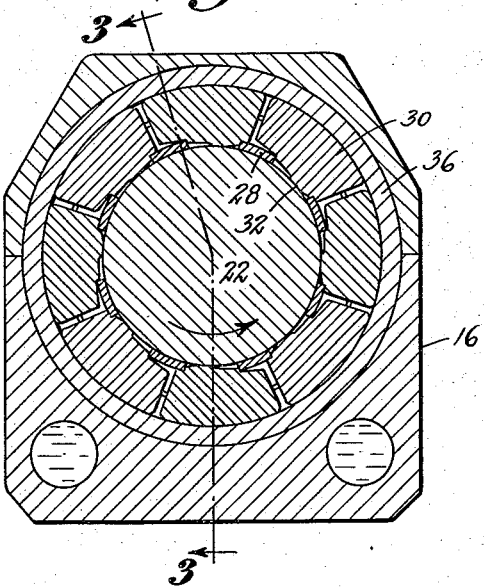
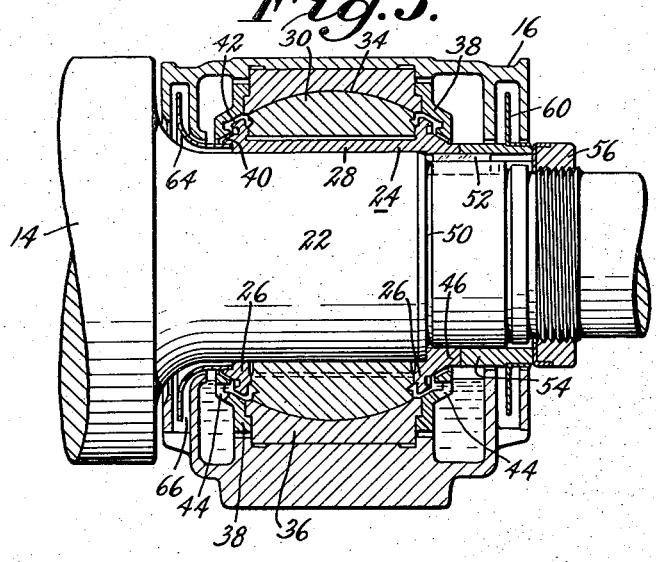
INVENTOR.
August Gunnar Ferdinand Wallgren,
BY
his ATTORNEY.

Patented Mar. 7, 1939

2,149,712

UNITED STATES PATENT OFFICE 2,149,712

BEARING

August Gunnar Ferdinand Wallgren, Stockholm, Sweden, assignor, by mesne assignments, to Aktiebolaget Nomy, Lidkoping, Sweden, a corporation of Sweden Application March 27, 1936, Serial No. 71,083
In Sweden April 2, 1935

5 Claims. (Cl. 308—73)

My invention relates to bearings and particularly to bearings of the tilting block type.

One of the objects of my invention is to provide a bearing unit, including a bearing housing and bearing members, which may be removed as a unit from a shaft without disassembling the bearing, and may be placed on a shaft in the same manner. Such a bearing unit is advantageous, for instance in connection with rolling mills where it is necessary to renew the rollers at frequent intervals, although my invention is not limited to any particular use of the bearings.

Another object of my invention is to provide a bearing of the above described type wherein the load transmitting bearing blocks directly contact the shaft.

Further objects and advantages of my invention will be apparent from the following description when considered in connection with the accompanying drawings forming a part of this specification and of which:

Fig. 4 is a cross-sectional view taken on the line 4—4 of Fig. 3; and

Fig. 5 is a cross-sectional view of a slightly modified form of bearing.

Figure 2:
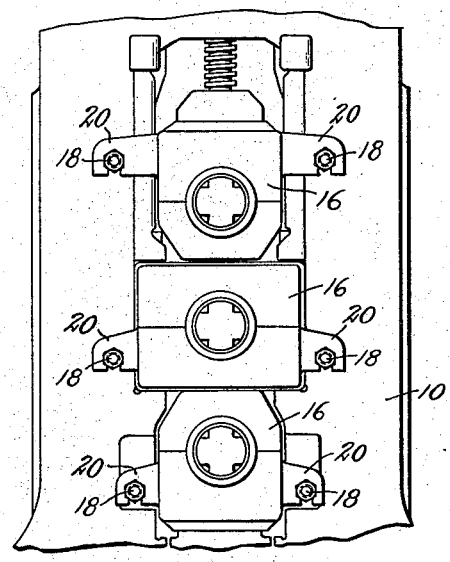
Fig. 2 is an end view of the device shown in Fig. 1.
Figure 1:
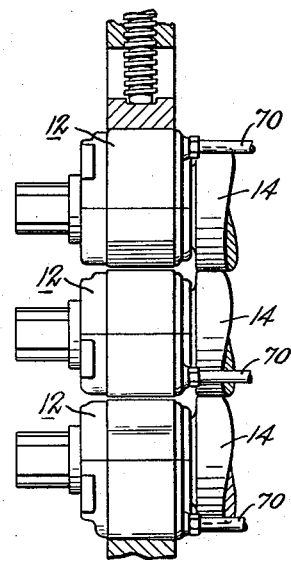
Fig. 1 is a side view, chiefly in elevation, of the bearings at one end of a three-roll mill.

Referring to the drawings, reference character 10 designates a portion of the framework of a rolling mill in which are supported three bearing units 12 for rotatably supporting three rollers 14. Bearing units 12 include bearing housings 16 which are adjustably secured to frame 10 by means of bolts 18 engaging ears 20 formed on the housings.

Each roll 14 is formed with a journal 22 upon which is loosely mounted a cage member 24. Cage 24 includes axially spaced rings 26 joined together by means of axially extending bars 28. A plurality of load transmitting bearing blocks 30 are positioned between rings 26 and are provided with eccentrically located projections 32 which contact journal 22 between bars 28. These bars engage recesses or notches formed in the radially inner faces of blocks 30 and serve to carry the blocks in rotation with the shaft. It will be noted that the blocks are longer than the peripheral distances between the bars whereby the blocks cannot fall radially inwardly when the bearing is removed from the journal 22. Due to the eccentric location of projections 32, the blocks are loaded to a greater degree at their trailing ends, whereby they are caused to tilt and, upon rotation, form wedge-shaped spaces which are filled with lubricant, in well known manner. The width of the blocks is substantially equal to the axial distance between rings 26, whereby the blocks are guided axially by the cage.

The radial outer faces 34 of bearing blocks 30 are provided with spherical bearing surfaces which cooperate with a spherical bearing surface formed on the radial inner side of a bearing ring 36. It is between these bearing surfaces that the aforesaid wedge-shaped spaces are formed. Bearing ring 36 is rigidly secured within bearing housing 16, as by clamping the upper and lower halves of the bearing housing around the ring. Annular rings 38 are secured to either end of bearing ring 36 and are provided with conical surfaces parallel with similar surfaces formed on rings 26 to provide conical spaces 40 and 42. During rotation of rings 26 with the shaft, centrifugal force causes lubricant to be fed through space 42 to the bearing surfaces, while space 40 tends to prevent the escape of lubricant from the bearing surfaces. Rings 38 may be formed with openings 44 in their lower parts below the lubricant level within the housing, which openings permit lubricant to flow to space 42.

Cage 24 is provided with an extension sleeve 46 at its end remote from roller 14 which sleeve loosely engages a shaft extension 48 having a smaller diameter than journal 22, there being a shoulder 50 between journal 22 and extension 48. Cage 24 is caused to rotate with the journal by means of a key 52 engaging keyways formed in extension 48 and sleeve 46 of the cage.

A collar 54 is secured to the shaft by means of a locknut 56 and is provided with a sleeve 58 which approaches sleeve 46 of the cage with a clearance space between the two. There is clearance also between sleeve 46 and shoulder 50. Collar 54 is provided with a radial vane 60 which rotates in an annular space 62 formed in the bearing housing in order to prevent as far as possible the entrance of foreign matter into the housing proper. A screen 64 is carried by the cage at the end adjacent roll 14 and rotates in an annular space 66 and serves to prevent entry of foreign matter at this end of the housing.

In operation, cage 24 is caused to rotate with journal 22 by means of key 52. Rotation of the cage causes bearing blocks 30 to be carried in relation with the journal and these blocks slide with respect to bearing ring 36. As previously explained, because of the eccentric loading of these blocks caused by projections 32 which contact the journal 22 being located eccentrically, wedge-shaped spaces are formed between the bearing surfaces, which spaces are filled with lubricant during rotation.

If it is desired to remove or replace a roll 14, this may be done by simply removing locknut 56, whereupon the entire bearing unit may be slid from the shaft without disassembling the unit. This may be done by reason of the fact that cage 24 has a loose fit on journal 22 and will slide axially thereon when locknut 56 is removed and the housing pulled toward the end of the shaft. Bars 28 prevent the bearing blocks 30 from being displaced and they remain in the position shown in the figures, even when the bearing is removed from the journal and the projections 32 on the blocks are not supported by contact with the journal. The cage retains the blocks in place and, when the bearing is removed from journal 22, is itself retained in place and centered with respect to bearing ring 36 by the blocks.

Due to the loose fit between journal 22 and cage 24 and the provision of clearance between sleeves 46 and 58 and between sleeve 46 and shoulder 50, journal 22 may be axially displaced by an amount equal to this clearance thus providing accommodation for shaft expansion due to temperature changes.

Figure 3:
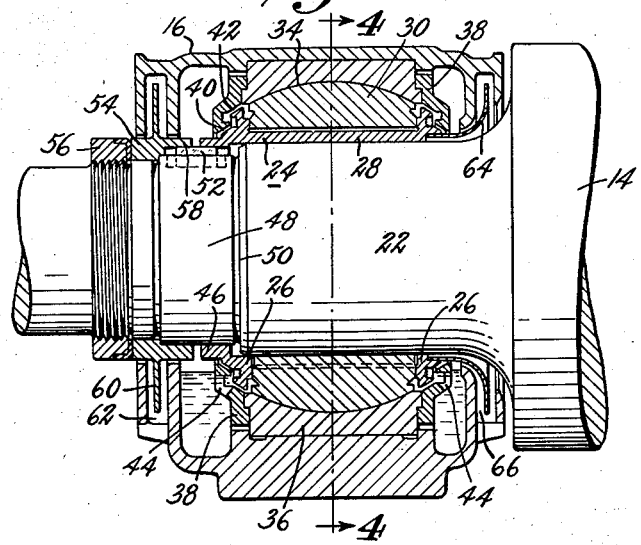
Fig. 3 is a cross-sectional view of one of the bearing units shown in Figs. 1 and 2, and is taken on the line 3—3 of Fig. 4.

Each roll 14 is provided with a bearing at each end and it is preferable that the bearing at one end be of the type above described while the bearing shown in Fig. 5 be employed to support the other end of the roll. The bearing shown in Fig. 5 differs from that above described only in the fact that sleeve 46 on cage 24 is clamped without clearance between collar 54 and shoulder 50, whereby there can be no relative axial movement between the journal and the cage. Thus, the bearing shown in Fig. 5 is able to resist thrust, and axial movement of the roll is prevented. As above described, the bearing shown in Fig. 3 permits a slight axial movement of this end of the roll, thus accommodating expansion and contraction of the roll.

If desired, the bearing units supporting opposite ends of a roll may be connected together by means of tie bolts 70. Thus, the axial position of a roll may be adjusted by adjusting the axial position of the guide bearing shown in Fig. 5, and tie bolts 70 assure that the other bearing, of the type shown in Figs. 3 and 4, will be properly adjusted with clearance between sleeves 46 and 58 and between sleeve 46 and shoulder 50.

It will thus be seen that I have provided a bearing wherein the load transmitting bearing blocks contact the shaft directly, thus doing away with the necessity of an additional ring, while at the same time the entire bearing may be removed from the journal, and replaced thereon, without requiring that the bearing be in any manner disassembled.

While I have shown and described more or less specific embodiments of my invention it is to be understood that this has been done for purposes of illustration only and that the scope of my invention is to be limited only by the appended claims viewed in the light of the prior art.

What I claim is:

1. In a bearing for a rotatable shaft, a housing, a bearing ring secured within said housing and having a bearing surface, a plurality of load transmitting elements having bearing surfaces cooperating with the bearing surface on said ring, a cage for retaining said elements in place and for carrying said elements in rotation therewith, projections formed on said elements for contacting said shaft, said cage being movable axially with respect to said shaft, and means for causing said cage to rotate with said shaft.

2. In a bearing for a rotatable shaft, a housing, a bearing ring secured within said housing and having a bearing surface, a plurality of load transmitting elements having bearing surfaces cooperating with the bearing surface on said ring, a cage for retaining said elements in place, said cage including peripherally spaced axially extending bars disposed between said shaft and said elements, projections formed on said elements for contacting said shaft between said bars, means for causing said cage to rotate with said shaft, said bars contacting said blocks and causing the blocks to rotate with the cage.

3. In a bearing for a rotatable shaft, a housing, a bearing ring placed within said housing and having a bearing surface, a plurality of load transmitting elements having bearing surfaces cooperating with the bearing surface on said ring, a cage for retaining said elements in place and for carrying said elements in rotation therewith, projections formed on said elements for directly contacting said shaft, and means for causing said cage to rotate with said shaft.

4. Bearing structure for a rotatable shaft including bearings for supporting the ends of said shaft, each bearing including a housing, a bearing ring secured within said housing and having a spherical bearing surface, a plurality of bearing blocks having spherical bearing surfaces cooperating with the bearing surface on said ring, projections formed on said blocks for contacting said shaft, a cage for retaining said blocks in place, the cage of one of said bearings being itself retained in place and centered with respect to said ring by said blocks and being movable axially with respect to said shaft, and the cage of the other bearing being fixed axially with respect to said shaft, and means for causing both of said cages to rotate with said shaft, said cages carrying the respective bearing blocks in rotation therewith.

5. In a bearing for a rotatable shaft, a housing, a bearing ring within said housing and having a bearing surface, a plurality of load transmitting blocks having bearing surfaces cooperating with the bearing surface on said ring, and having tilting surfaces cooperating with said shaft, a cage for retaining said blocks in place and preventing radially inwardly displacement of the blocks whereby the bearing may be mounted on and removed from the shaft as a unit without disassembly, and means for causing said gage to rotate with said shaft, said cage carrying said blocks in rotation therewith.

AUGUST GUNNAR
FERDINAND WALLGREN.